United States Patent [19]

Anghileri

[11] Patent Number: 5,217,631

[45] Date of Patent: Jun. 8, 1993

[54] COOKING AND DISTRIBUTION VESSEL FOR FOOD MATERIAL

[75] Inventor: Gianmario Anghileri, Malgrate, Italy

[73] Assignee: Novacart, S.P.A., Como, Italy

[21] Appl. No.: 708,853

[22] Filed: May 31, 1991

[30] Foreign Application Priority Data

Jun. 29, 1990 [IT] Italy ............... 21431/90[U]

[51] Int. Cl.⁵ .............................................. A21C 15/02
[52] U.S. Cl. ..................................... 249/120; 99/426;
   99/DIG. 15; 249/139; 249/DIG. 1; 426/512
[58] Field of Search ............... 249/117, 134, 120, 139,
   249/DIG. 1, DIG. 2; 99/426, 428, 439, DIG.
   15; 426/512, 505

[56] References Cited

U.S. PATENT DOCUMENTS

| | | | |
|---|---|---|---|
| 85,605 | 1/1869 | Musgrove | 249/DIG. 1 |
| 872,837 | 12/1907 | Mio | 249/DIG. 1 |
| 2,027,296 | 1/1936 | Stuart et al. | 99/DIG. 15 |
| 2,077,868 | 4/1937 | Adams | 99/DIG. 15 |
| 4,216,241 | 8/1980 | Thompson | 99/426 |

FOREIGN PATENT DOCUMENTS 46364 10/1932 Denmark ............... 99/428

Primary Examiner—Jay H. Woo
Assistant Examiner—Khanh P. Nguyen
Attorney, Agent, or Firm—Laff, Whitesel, Conte & Saret

[57] ABSTRACT

The vessel includes a small cup (2) made of paper material, having an upper edge (7) formed with a series of folded over peripherally-extending consecutive portions (7a) arranged to define a circumferential engagement groove (9) along the outer edge of the cup, and a laminar support (10) made of stiff paper material and provided with a through hole (10a) to detachably house said small cup at the circumferential groove thereof. Advantageously, the cup (2) is formed with two bun cases (3, 4) introduced into each other upon interposition of a stiff laminar insert (11) disposed intermediate the two bun case bottoms (3a, 4a).

4 Claims, 2 Drawing Sheets

COOKING AND DISTRIBUTION VESSEL FOR FOOD MATERIAL

BACKGROUND OF THE INVENTION

1. Field of the Invention

The present invention relates to a cooking and distribution vessel for cakes or food in general comprising at least a small cup made of paper material, adapted to be directly introduced into an oven and having an upper rim formed with a series of peripherally-extending consecutive portions folded over towards the outside, the inside and again the outside respectively, so as to define a peripheral engagement groove along the outer edge of the small cup, and a laminar support made of stiff paper material and provided with a through hole for detachably housing said small cup, in the region of the peripheral groove thereof.

2. Prior Art

It is known that cooking and distribution vessels for cakes and food in general are available on the market. Said vessels are substantially formed with a laminar support made of paper provided with a through hole in which a bun case designed to contain a bun or other cake is housed. By the term "bun case" in the pastry-making confectionary field it is meant a vessel made of pleated paper material obtained by molding from flat paper sheets. When finished, the bun case has a substantially frusto-conical or frusto-pyramidal top-open shape.

In greater detail the bun case is comprised of a substantially flat bottom wall from which a pleated side wall circumferentially extends in a substantially vertical direction. In addition, formed along the upper edge of the side wall by a series of consecutive folded over portions, is an outer circumferential groove adapted to enable the removable engagement of the bun case with the support.

Normally the laminar supports are originally joined to one another in order to form a baking tin that can be used for holding a predetermined number of cakes and enable the simultaneous introduction and removal of said cakes into and from the baking oven when the production takes place industrially.

The junction between the laminar supports takes place along respective break lines defined by punching, in order to enable the cakes to be easily separated from one another so that they can be individually distributed to consumers. In addition, it is provided that at the intersection area between the different break lines, shaped engagement seatings be formed that enable the baking tin to be seized by grasping means carried by automatized conveyor means used in the cake cooking and packaging plants.

Although the above described vessels appear efficient, they still have some drawbacks.

Actually, since the bun cases are made with paper adapted for food the basis weight of which is sometimes very reduced in order to control the costs thereof as much as possible, they have problems connected with a weak strength which results in wear, due to the high moisture present under some environmental conditions.

Frequently it is in fact necessary to put the vessels in the refrigerator for more or less long periods of time for the purpose of preserving the product contained therein. For example, at the end of a working day, the confectioner must put the amount of unsold cakes in the refrigerator for a better preservation of them that will enable him to sell the same the following day.

In addition, it may happen that, due to production requirements, the dough introduced into the bun cases needs to be put in the refrigerator before its final cooking.

Under these conditions the bun cases of the present vessels have tendency to become moist and to collapse, thereby losing their elasticity, strength and seal characteristics in an irreversible manner.

As a consequence of that the vessels are no longer reliable in the conveying operations during the various production and packaging steps. In addition, the alterations of the bun cases impairs the aesthetic features of the final product giving the buyer an impression of bad quality of the product itself that, although wrong, induces him to buy other cakes that look fresher.

Another problem encountered at the present state of the art is connected with the obtention of an adequate distribution of heat inside the vessel during the cake cooking. In the connection it is to be pointed out that some types of cakes need a greater amount of heat close for example to the side surface thereof rather than at the bottom or vice-versa, for the achievement of an optimal cooking.

SUMMARY OF THE INVENTION

The general object of the present invention is to eliminate the problems of the known art by a vessel of simple construction and improved practical use.

A particular object of the invention is to provide a vessel for cakes made of paper material adapted to be put in the refrigerator without running the risk of undergoing alterations as regards its strength, seal and consistency features.

Another object of the invention is to provide a vessel enabling an optimal distribution of heat in the cake contained therein during the cooking.

The foregoing and further objects that will become more apparent in the course of the present description are substantially attained, in accordance with the present invention, by a vessel for cooking and distributing cakes or food in general, wherein said small cup comprises a first bun case, a stiff laminar insert piece disposed at the bottom of said first bun case, and a second bun case inserted in said first bun case and designed to come in contact with the cake, the peripheral folded portions of the edges of said first bun case being in a contact relationship with the corresponding folded portions of the second bun case so that the engagement groove of the second bun case is housed within the engagement groove of the first bun case.

BRIEF DESCRIPTION OF THE DRAWINGS

Further features and advantages will best be understood from the detailed description of a cooking and distribution vessel for cakes and food in general in accordance with the present invention given hereinafter by way of non-limiting example with reference to the accompanying drawings, in which.

DESCRIPTION OF THE PREFERRED EMBODIMENT

Figure 1:
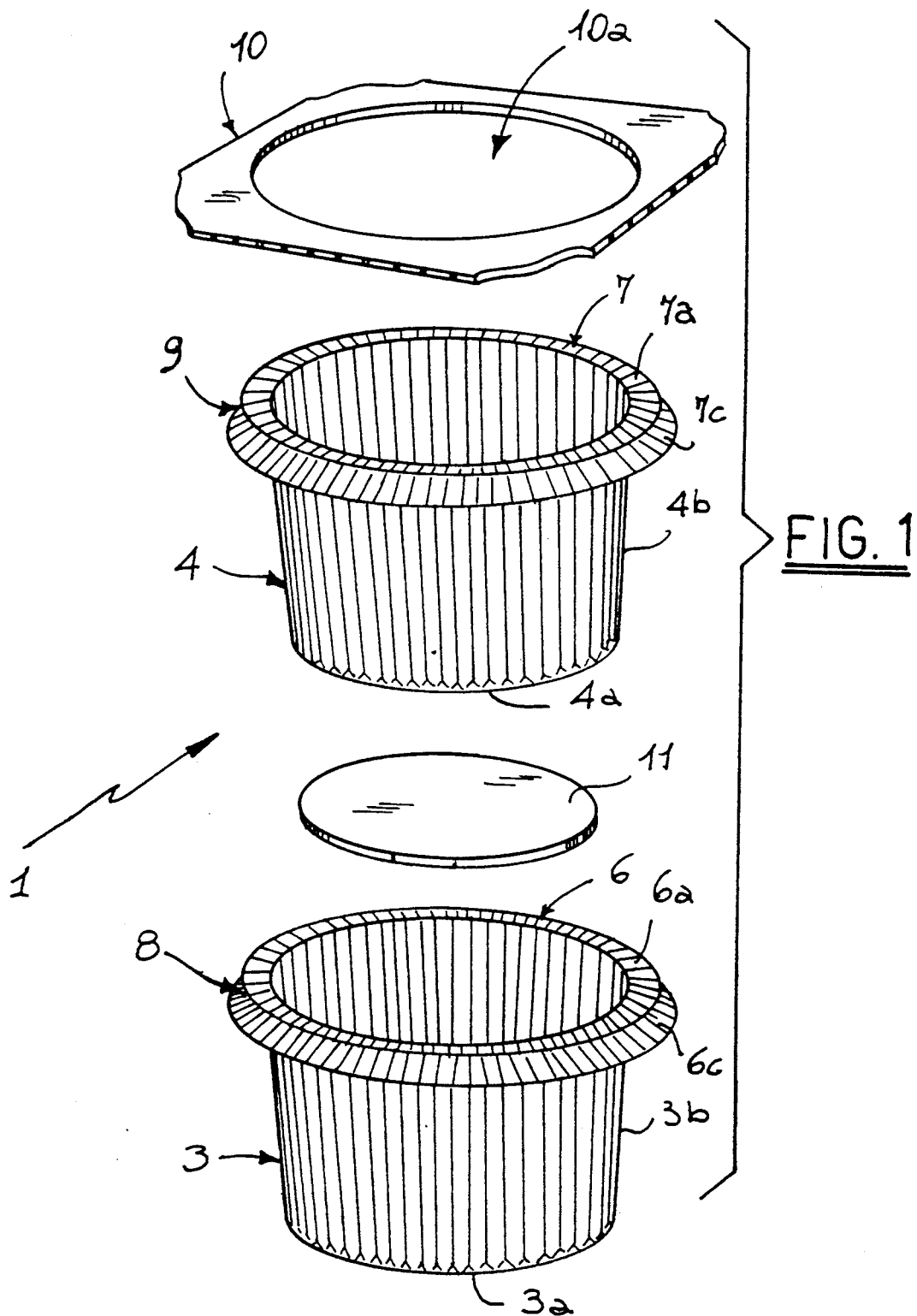
FIG. 1 is an exploded perspective view of a vessel in accordance with the invention.

Referring to the drawings and in particular to FIG. 1, a cooking and distribution vessel for cakes or food in general in accordance with the present invention has been generally identified by reference numeral 1.

Vessel 1 comprises a small cup 2 adapted to be directly introduced into an oven and designated to hold a cake or another similar food. This cup 2 is made of pleated paper material and obtained by molding from flat paper sheets. It essentially consists, as clearly shown in FIGS. 1 and 2, of a first bun case 3 made of heat- and humidity-resistant paper material and a second bun case of substantially the same shape as the first bun case 3, which is introduced into the first bun case 3 and is made of humidity- and fat-resistant paper material adapted for food, of light base weight. The bun cases 3 and 4 thus formed exhibit a substantially top-open frustoconical form and have a substantially flat base 3a, 4a from which a pleated side wall 3b, 4b circumferentially extends in a substantially vertical direction.

Each of the bun cases 3 and 4 exhibits an upper edge 6 and 7 formed with respective series of peripherally-extending consecutive portions which are folded over towards the outside 6a, 7a, the inside 6b, 7b and once again the outside 6c, 7c respectively, so as to define respective peripheral engagement grooves 8, 9 along the outer edge of the cups 2.

Figure 2:
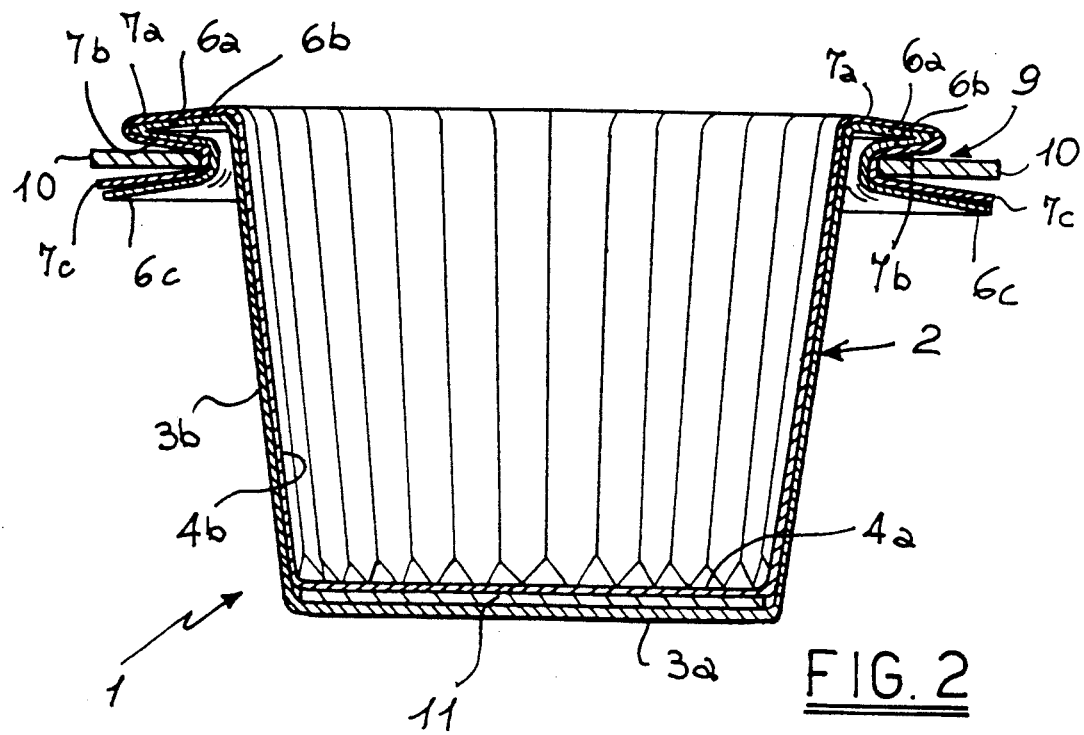
FIG. 2 is a sectional view of the vessel shown in FIG. 1 taken along a diametrical plane thereof.

As can be easily viewed from FIG. 2, the folded peripheral portions 6a, 6b and 6c of the first bun case edge 6 are in a contact relationship with the corresponding folded portions 7a, 7b and 7c of the second bun case edge 7 so that the engagement groove 9 of the second bun case 4 is housed within the engagement groove 8 of the first bun case 3.

The vessel 1 further comprises a laminar support 10 made of stiff paper material and provided with a through hole 10a for detachably accommodating the cup 2 at the peripheral groove 9 thereof.

Advantageously and in accordance with a feature of the invention, a laminar insert piece 11 is also located at the bottom of the first bun case 3. The presence of the insert piece 11 makes the cup structure more solid, on the one hand enabling the cakes contained therein to be transported in a very reliable and easy manner and, on the other hand, conveniently preventing the humidity effect caused by the introduction of the cakes in the refrigerator from endangering the product. In an original manner, the presence of the insert piece 11 also enables heat to be distributed in the cake during the cooking step in a predetermined manner selected on the basis of the product to be obtained.

Figure 3:
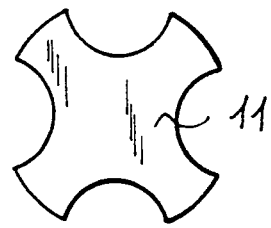
FIG. 3 is a plan view of a laminar insert piece designed to be associated with the vessel.
Figure 4:
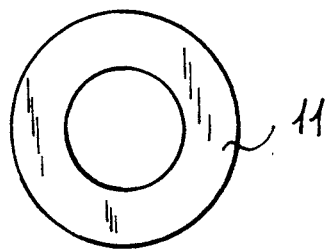
FIG. 4 is a plan view of another laminar insert piece according to a different embodiment.

For example, in case of cakes that for a good cooking need a greater amount of heat at the sides than at the bottom the use of a vessel 1 in which the laminar insert piece has a substantially annular configuration as shown in FIG. 4 will be provided. If, on the contrary, the cake needs a greater amount of heat at the bottom a cross-shaped insert piece 11 will be used, as shown in FIG. 3.

Obviously the above described solutions are given by way of example only and the laminar insert piece 11 can be made of different shapes depending on requirements.

Advantageously, the insert piece 11 can be manufactured directly during the support 10 punching step by utilizing the off-cuts obtained at the execution of the through hole 10a.

The present invention attains the intended purposes.

The presence of the laminar insert piece gives the bun case in question a high resistance to deformations, making it also suitable for keeping cakes or food in general in the refrigerator.

It also to be noted that the laminar insert piece can be advantageously shaped so that any predetermined distribution of heat during the cake cooking can be achieved.

Obviously, modifications and variations can be made to the invention as conceived, all of them falling within the scope of the invention idea.

What is claimed is:

1. A cooking and distribution vessel for food material comprising a first bun paper case having a first bottom, a first peripheral sidewall upwardly extending from said bottom and a first upper rim, said first upper rim including a plurality of first peripherally extending consecutive portions which define a first protrusion portion and a first engagement groove portion; a second bun paper case having a second bottom and a second upper rim, said second rim including peripherally extending consecutive portions which define a second protrusion portion and a second engagement groove portion wherein said first case receives said second case such that the first protrusion portion engages the second protrusion portion and the first groove portion engages the second groove portion; a laminal support made of stiff paper material and having a through hole for detachably housing the first and the second cases in such a manner that the second groove contacts an inner edge of the laminar support; and a stiff laminar insert piece disposed on an upper surface of the first bottom of the first case and contacting a lower surface of the second bottom of the second case for supporting said second case.

2. The vessel as claimed in claim 1, wherein said laminar insert piece made of paper material is of annular form.

3. The vessel as claimed in claim 1, wherein said laminar insert piece is of disk-shaped configuration.

4. The vessel as claimed in claim 1, wherein said laminar insert piece is of cross-shaped configuration.

* * * * *